United States Patent [19]

Nicolas et al.

[11] Patent Number: 4,511,959
[45] Date of Patent: Apr. 16, 1985

[54] DECENTRALIZED ARBITRATION DEVICE FOR SEVERAL PROCESSING UNITS OF A MULTIPROCESSOR SYSTEM

[75] Inventors: Alain Nicolas; Jean Chapelain, both of Colombes, France

[73] Assignee: Thomson-CSF - Telephone, Colombes, France

[21] Appl. No.: 318,136

[22] Filed: Nov. 4, 1981

[30] Foreign Application Priority Data

Nov. 7, 1980 [FR] France ............... 80 23877

[51] Int. Cl.³ .................................... G06F 13/00
[52] U.S. Cl. ....................................... 364/200
[58] Field of Search ... 364/200 MS File, 900 MS File

[56] References Cited

U.S. PATENT DOCUMENTS

| | | | |
|---|---|---|---|
| 4,035,777 | 7/1977 | Moreton | 364/200 |
| 4,151,592 | 4/1979 | Suzuki et al. | 364/200 |
| 4,229,791 | 10/1980 | Leuy et al. | 364/200 |
| 4,326,250 | 4/1982 | McCullough et al. | 364/200 |
| 4,334,288 | 6/1982 | Booher | 364/900 |
| 4,363,096 | 12/1982 | Comfort et al. | 364/200 |
| 4,366,535 | 12/1982 | Cedolin et al. | 364/200 |
| 4,373,183 | 2/1983 | Means et al. | 364/200 |
| 4,375,639 | 3/1983 | Johnson | 364/200 |
| 4,412,281 | 10/1983 | Works | 364/200 |
| 4,417,302 | 11/1983 | Chimienti et al. | 364/200 |

OTHER PUBLICATIONS

"LSI Arbiters Supervise Bus Access Priorities in Multiprocessor Systems", Stephen J. Durham, Microprocessor Systems Design and Applications, 1980, pp. 14–19.

Primary Examiner—Gareth D. Shaw
Assistant Examiner—Tim A. Wiens
Attorney, Agent, or Firm—Oblon, Fisher, Spivak, McClelland & Maier

[57] ABSTRACT

The decentralized arbitration device of the invention comprises an arbitration unit associated with each processing unit. This arbitration unit comprises an individual elementary arbitrator and a level elementary arbitrator. Their outputs are connected to a comparator which compares their output signals with the code of the unit considered, which code is supplied by a coding identification circuit. The individual priority request terminals of the units in the same level are connected together and the level priority request terminals of all the units are connected together.

4 Claims, 2 Drawing Figures

DECENTRALIZED ARBITRATION DEVICE FOR SEVERAL PROCESSING UNITS OF A MULTIPROCESSOR SYSTEM

BACKGROUND OF THE INVENTION

1. Field of the Invention

The present invention relates to a decentralized arbitration device for several processing units of a multiprocessor system.

2. Description of the Prior Art

From the article on pages 154 to 158 of the April 1978 number of the review "Computer Design" an arbitration process and an arbitration device are known for a multiprocessor system comprising several identical processing units all connected to the same bus. This known arbitrator, of a synchronous type, allows a rotating priority to be established between the different processing units so that none of them monopolizes the bus, and so that the processing carried out by the multiprocessor system is the speediest possible. The known arbitrator comprises essentially a read-only memory (ROM) in which all the possible configurations of reservation requests for the bus and the corresponding states are programmed.

This known device requires a large number of connecting wires between the arbitrating device and the different processing units, which may be troublesome when the number of processing units is high.

In addition, the size of the ROM used in the known arbitrator depends on the number of processing units cooperating therewith. If the number of processing units is not very high, the capacity of the ROM required for constructing the arbitrator is correspondingly low, and the arbitrator is then inexpensive and easy to construct. On the other hand, if the number of processing units is high, several high-capacity memories must be used and the construction of the arbitrator becomes complex and costly.

The present invention has as its object a decentralized arbitration device not presenting the disadvantages of the known device, which device is easy to construct and inexpensive.

SUMMARY OF THE INVENTION

The decentralized arbitration device in accordance with the present invention is applied to p.n processing units all connected to a common bus and distributed in p levels each comprising n processing units each associated with an arbitration unit, and each arbitration unit comprises an elementary arbitrator for determining individual priority and an elementary arbitrator for determining level priority, the inputs of the individual priority elementary arbitrators being connected, in each level, to the corresponding conductors of an individual request connection particular to the level considered, the entries of the elementary level priority determining arbitrators of all the arbitration units being connected to the corresponding conductors of a common level priority request connection, the inputs of the two elementary arbitrators of each arbitration unit being also connected to the output of a priority request signaling device of the corresponding processing unit.

According to another characteristic of the invention, in each arbitration unit, the outputs of the two elementary arbitrators are connected to a series of inputs of a comparator in which the other series of inputs is connected to the output of a circuit for identifying the processing unit considered and its arbitration unit, the output of the comparator being connected, through a flip-flop, to the bus utilization authorization input of the corresponding processing unit, the two elementary arbitrators supplying, when they have determined that the corresponding processing unit may use the bus, the same identity as that supplied by said corresponding identification circuit.

According to another characteristic of the invention, said identification circuit comprises a coding circuit, preferably binary coding, supplying a level code corresponding to the level in which is disposed the processing unit with which the arbitration unit considered cooperates, and supplying a rank code corresponding to the rank of this processing unit in its level, said identification circuit being connected to said priority request signaling device.

According to yet another characteristic of the invention, said signaling device comprises a transcoding ROM one addressing input of which is connected to the bus utilization request output of the corresponding processing unit, and the other addressing inputs of which are connected to said identification circuit, the outputs, preferably of the open-collector type, of this memory, and the number of which is equal to the sum of the number of levels and of the number of processing units per level, being connected to the corresponding inputs of the level elementary arbitrator and of the individual elementary arbitrator respectively.

BRIEF DESCRIPTION OF THE DRAWINGS

The present invention will be better understood from reading the detailed description of one embodiment taken as a nonlimiting example and illustrated by the accompanying drawings in which.

DESCRIPTION OF THE PREFERRED EMBODIMENT

Figure 1:
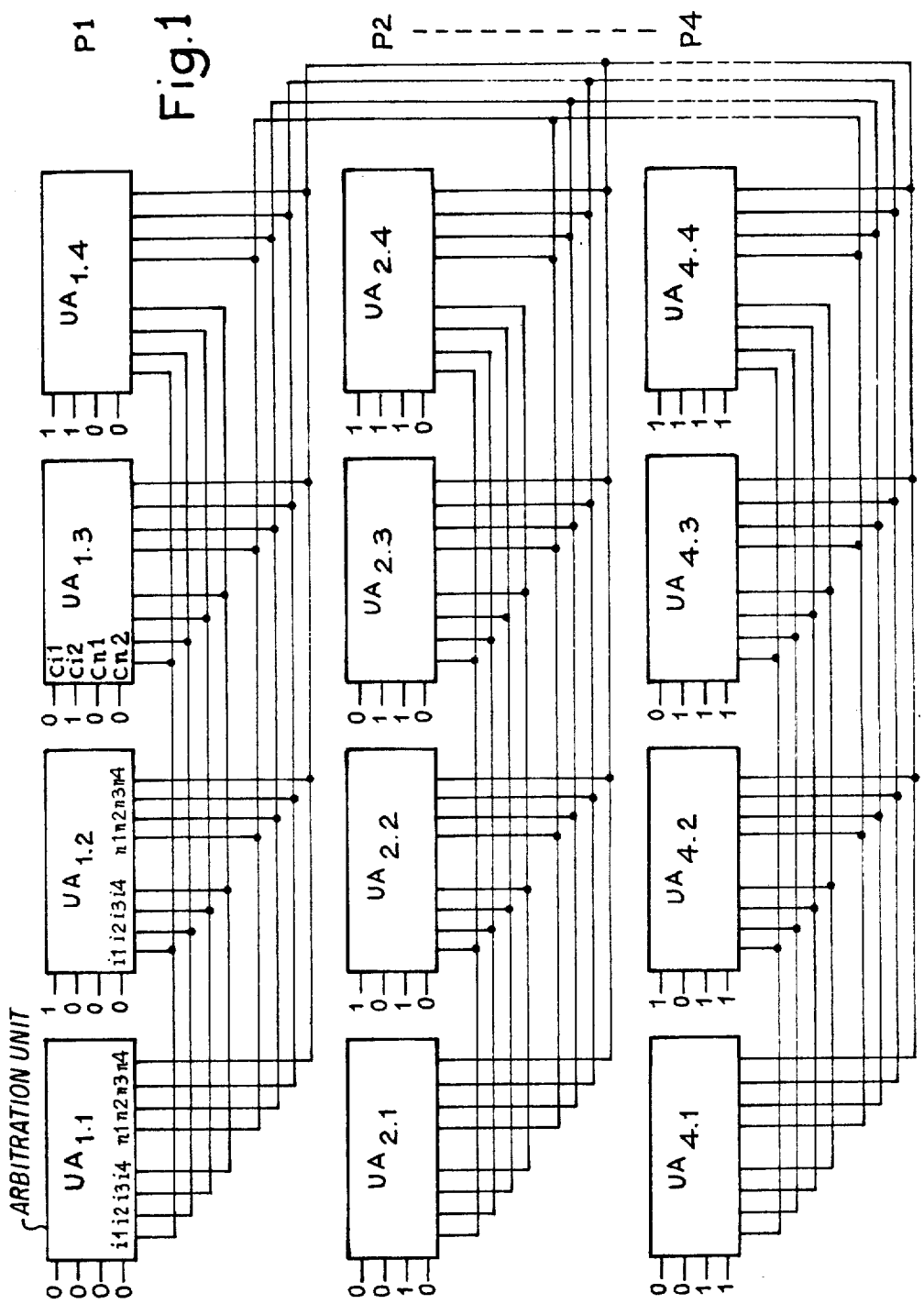
FIG. 1 is a block diagram of a decentralized arbitration device in accordance with the invention.

There is shown in FIG. 1 the block diagram of an arbitration device for a multiprocessor system having sixteen processing units. However, it will be readily understood that the invention applies to a multiprocessor system comprising any number of processing units. These sixteen processing units are arbitrarily divided into p groups or levels each comprising n processing units. In the present case p.n = 16, i.e. a perfect square, and preferably p = n = 4. In the cases where this number p.n is not a perfect square, p is preferably chosen the closet possible to n, p being able to be greater or smaller than n.

The p.n processing units of the multiprocessor system to which the device of the invention is applied are connected to a common data communication bus (not shown). However, it will be readily understood that the invention is not limited to the application to a multiprocessor system but may be applied to any system in which arbitration must be made between several subassemblies using a common communication channel and capable of simultaneously requesting use of this channel.

So as not to overload the drawings, the processing units have not been shown but only the arbitration units assigned to each of these processing units. Since each of these arbitration units takes up very little space, as will be seen below, it may be easily disposed on the printed circuit card of the corresponding processing unit.

The p.n arbitration units shown schematically and partially in FIG. 1, corresponding respectively to the p.n processing units, are referenced $UA_{1,1}$ to $UA_{1,4}$ for those relative to the processing units of the first level P1, $UA_{2,1}$ to $UA_{2,4}$ for the second level P2, $UA_{3,1}$ to $UA_{3,4}$ for the third level P3 and $UA_{4,1}$ to $UA_{4,4}$ for the fourth level P4.

Each arbitration unit comprises, for external connection, a series of four individual priority request signaling terminals referenced i1 to i4. In each level separately, the terminals i having the same reference are connected together. Thus, for example, in level P1, the four terminals i1 of the arbitration units $UA_{1,1}$ to $UA_{1,4}$ are connected together, the four terminals i2 are connected together, etc.

Each arbitration unit also comprises for external connection, four level priority request signaling terminals referenced n1 to n4. For the whole of the arbitration units, the terminals n having the same reference are all connected together. Thus, for example, the terminals n1 of the sixteen arbitration units are all connected together.

Furthermore, each arbitration unit comprises a series of identification terminals. Preferably, the identity of the arbitration unit is supplied by a coding circuit which is advantageously external to the printed circuit card supporting the arbitration unit and, if such be the case the corresponding processing unit, which allows these cards to be standardized, only the supports or connectors of these cards being individualized, which will appear more clearly below. Since, in the arbitration device, there are four levels and since each level comprises four arbitration units, it is sufficient, for coding which is preferably in binary code, to provide two binary elements for coding the different levels, and two binary elements for coding each arbitration unit within its level. Consequently, each arbitration unit comprises two identification terminals per individual coding (coding within a level), respectively referenced ci1, ci2 and two identification terminals per level coding, respectively referenced cn1, cn2.

It will of course be readily understood that if the multiprocessor system comprised a different number of processing units, and if the number of levels and/or units per level were different, the number of coding terminals would be, depending on the case, modified accordingly.

In the embodiment shown in FIG. 1, the levels P1 to P4 have been coded respectively "00", "01", "10" and "11", the terminals cn1 and cn2 being respectively assigned to the bits having a weight of 0 and 1. Within each level, the arbitration units are coded "00", "01", "10" and "11" in the order of their references, i.e. for example for level P1, from $UA_{1,1}$ to $UA_{1,4}$ respectively. So as to simplify the drawing, the different coding circuits have not been shown in FIG. 1, but only the values of the logic levels "0" and "1" corresponding to the coding of the inputs ci and cn of the arbitration units of levels P1, P2 and P4, the only ones shown. These coding circuits are circuits supplying the logic levels "1" and "0" to the corresponding coding terminals. Since their construction is obvious for a man skilled in the art, they will not be described in detail.

Figure 2:
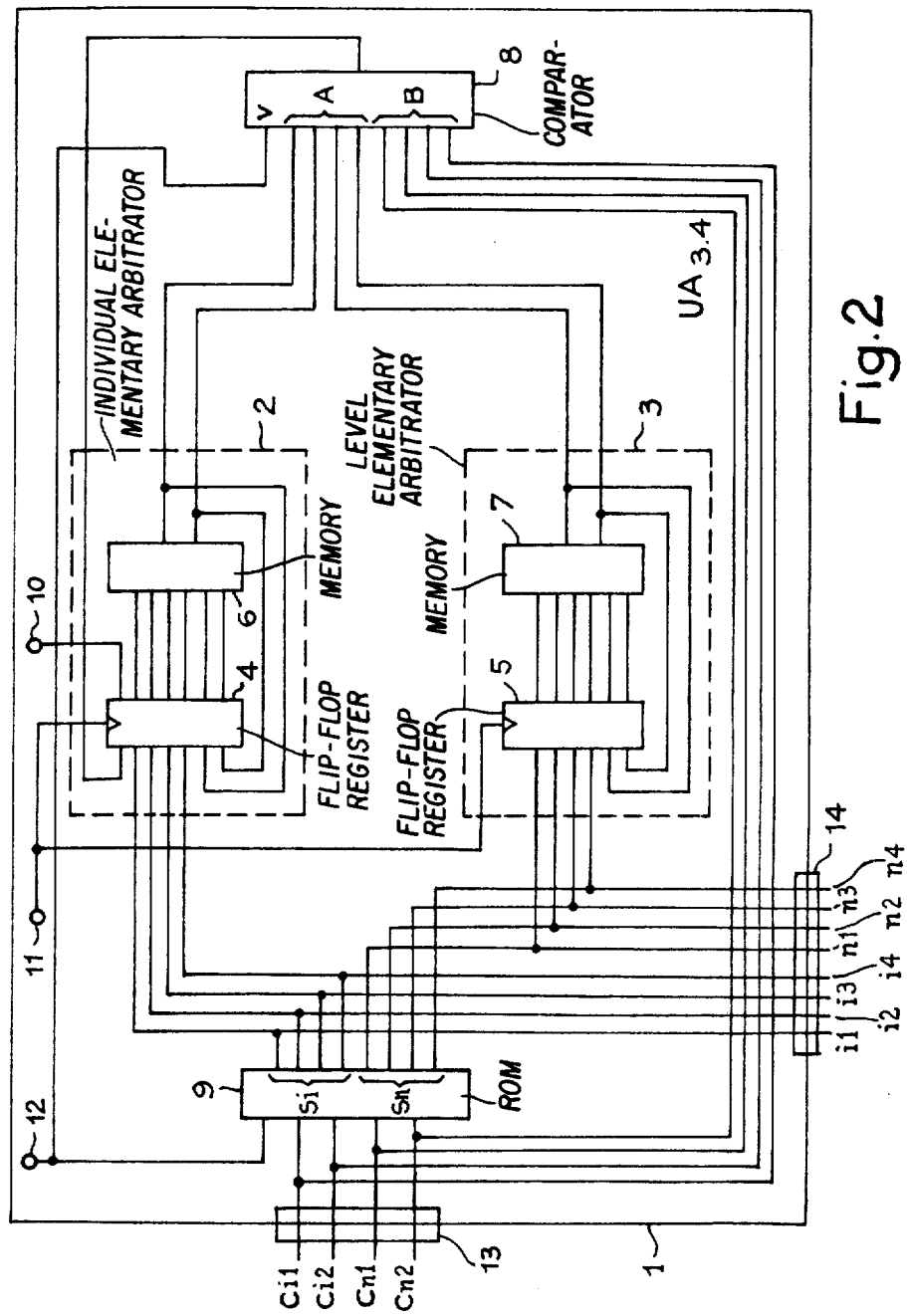
FIG. 2 is a detailed diagram of an arbitration unit of the device of FIG. 1.

In FIG. 2 there is shown the detailed diagram of the preferred embodiment of an arbitration unit $UA_{p,n}$ in accordance with the invention, all the arbitration units of the arbitration device of FIG. 1 being then constructed identically with that of FIG. 2.

The arbitration unit $UA_{p,n}$, for example $UA_{3,4}$, shown in FIG. 2 is formed from integrated circuits disposed on a printed-circuit card 1 which is advantageously the card supporting the elements of the corresponding processing unit. The arbitration unit $UA_{p,n}$ comprises an individual elementary arbitrator 2 and a level elementary arbitrator 3. The elementary arbitrators 2 and 3 are constructed in a way known per se in accordance with the article in "Computer Design", and each comprise a D flip-flop register referenced 4, 5 respectively, and an ROM referenced 6, 7 respectively.

The register 4 of the elementary arbitrator 2 comprises seven cells of which six serve for the arbitration properly speaking, the seventh cell serving simply for transfering, in a way explained below, the bus utilization authorization, supplied by the arbitration unit, to the corresponding processing unit, in synchronism with an active front of the clock signal fed to the elementary arbitrators. However, it is not absolutely necessary to use a cell of register 4 for transferring this authorization, and a separate flip-flop could just as well be used receiving the same clock signal as registers 4 and 5. One input of register 4, corresponding to said seventh cell, is connected to the output of a comparator 8. Four other inputs of register 4 are connected on the one hand to a first series Si of outputs of a transcoding ROM 9 of the open-collector output type, and on the other hand to terminals i1 to i4 respectively. Two other inputs of register 4 are connected to the two outputs of ROM 6. The output of said seventh cell of register 4 is connected to a terminal 10 which is itself connected, in a way not shown, to the bus utilization authorization input of the corresponding processing unit. The six other outputs of register 4 are respectively connected to the six addressing inputs of memory 6.

The register 5 of the elementary arbitrator 3 comprises six cells. Its first four inputs are connected on the one hand to a second series Sn of outputs of memory 9 and on the other to the terminals n1 to n4. The other two inputs of register 5 are connected to the two outputs of ROM 7. The clock signal inputs of registers 4 and 5 are connected together to a terminal 11 which is itself connected to an appropriate clock signal generator (not shown).

The ROM 9 comprises five addressing inputs four of which are connected to the terminals ci1, ci2, cn1, cn2 respectively. The fifth addressing input of memory 9 is connected to a terminal 12 itself connected to the bus utilization request output (not shown) of the corresponding processing unit.

The enabling input v of the comparator 8 is connected to terminal 12. Comparator 8 comprises two series A, B of four inputs each. Two of the four inputs of series A are connected to the two outputs of memory 6, and the other two inputs of series A are connected to the two outputs of memory 7. The four inputs of series B are connected to terminals ci1, ci2, cn1 and cn2 respectively.

With a view to standardizing the cards supporting the arbitration unit, so as to ensure their perfect interchangeability, terminals ci1, ci2, cn1 and cn2 are made in fact in the form of pins on a connector 13 integral with card 1. Similarly, terminals i1 to i4 and n1 to n4 are made in the form of pins on a connector 14 integral with card 1. To further simplify the construction, connectors 13 and 14 may be joined up to form a single connector or even joined up to the connector of the processing unit if this latter is disposed on card 1.

The operation of the above-described device will now be explained, with a detailed description of programming the ROMs used.

ROM 9 is a transcoding memory. It is programmed so that each of the four outputs of series Si and of series Sn are activated when the corresponding binary code is applied to terminals ci1, ci2 and cN1, cn2 respectively. Thus, codes "00", "01", "10" and "11" applied to ci1 and ci2 activate the outputs of series Si connected to terminals i1 to i4 respectively. Similarly, the codes "00", "01", "10" and "11" applied to cn1 and cn2 activate the outputs of the series Sn connected to terminals n1 to n4 respectively. Thus, each elementary arbitrator such as arbitrator 2 knows the rank of the corresponding processing unit within its level, and each elementary arbitrator such as 3 knows the level in which this processing unit is disposed. Consequently, the arbitration unit knows the identity of the corresponding processing unit within the multiprocessor system.

Memories 6 and 7 of each arbitration unit are programmed similarly to that shown in said article in "Computer Design". However, unlike the known process, and as explained in more detail below, in accordance with the present invention the attribution of priorities is first of all carried out in accordance with a main cycle during which the priority is distributed according to a given order, preferably once during a cycle, to each of the levels requesting it, and then in accordance with secondary cycles for each of the levels, the priority being distributed in a given order, for each level, preferably once during a cycle, to each of the processing units in the same level which request it. The main cycle is effected simultaneously by all the elementary arbitrators 3, whereas the different secondary cycles are each effected by all the arbitrators 2 of the corresponding level. In the present case, there are four secondary cycles which are effected independently of each other.

The determination of the present and future states of each of the elementary arbitrators takes place in the simplest way: only two states are considered, namely master of the bus or not. Other states could be considered such as "at rest", "in reserve" (master of the bus during the subsequent cycle) or "waiting" (master of the bus after the one which is at present "in reserve"), but that would complicate proportionately the programming of the memories, and the gain in time thus achieved in determining the order of the priorities would still not be sufficiently turned to account.

The outputs (taken in order, i.e. from top to bottom in the case shown in the drawings) of memories 6 and 7 are coded in accordance with the same code as that used for coding terminals ci1, ci2 and cn1, cn2, respectively. Thus, for example in the case of arbitration unit $UA_{3,4}$, the code applied to terminals ci1, ci2 is "11" (n=4) and the one applied to terminals cn1, cn2 is "10" (p=3). Consequently, when the elementary arbitrator 3 of unit $UA_{3,4}$ determines, on a first active front of the clock signal applied to terminal 11, that the priority returns to level 3, the binary signal present at the outputs of memory 7 of unit $UA_{3,4}$ in particular is "10" (this signal is moreover present at the outputs of the memories 7 of all the arbitration units). When the elementary arbitrators 2 of unit $UA_{3,4}$ determines, from said first active front of the clock signal, that, in level 3, the priority returns to this fourth unit $UA_{3,4}$, the binary signal present at the outputs of memory 6 of this unit in particular (as well as at the outputs of the memories 6 of the other units of level 3) is "10". When the two above-mentioned binary signals are simultaneously present at the outputs of memories 7 and 6 respectively, the configuration of the signal at the four inputs of series A of comparator 8 is identical to the configuration of the signal at the four inputs of series B of comparator 8 which are connected to terminals ci1, ci2, cn1 and cn2 and so receive the code corresponding to arbitration unit $UA_{3,4}$. If at this time, the corresponding processing unit $UT_{3,4}$ claims use of the bus and emits at terminal 12 a bus utilization request signal, for example a logic signal "1", this signal is applied on the one hand to the input of memory 9 which transmits it to terminals i4 and n3 to inform all the other arbitration units thereof and to modify accordingly the addressing of their respective memories on the consecutive active front of the clock signal, and on the other hand to the enabling input v of comparator 8. Comparator 8, charged with comparing the signals present at inputs A and B, then emits an equality signal, for example a logic level "1". When a second active front of the clock signal is applied to terminal 11, said seventh cell of register 4 causes a bus utilization authorization signal to appear at terminal 10 and simultaneously this second active front causes the addressing of the memories of the arbitration units to be modified. In fact, unit $UT_{3,4}$ has just obtained priority and, theoretically, can no longer obtain it if other units claim use of the bus, during the complete cycle in progress, after effecting an elementary operation (for example writing a word transmitted by the bus into its memory or reading a word memorized at a given address in its memory and fed over the bus during the time interval separating two consecutive active fronts of the clock signal). Consequently, more especially in unit $UA_{3,4}$ said second active front of the clock signal causes registers 4 and 5 to transfer to the inputs of memories 6 and 7 respectively an addressing configuration such that the configuration of the output signals of these memories, which configuration is applied to the A series of inputs of comparator 8, is different from the configuration of the code of unit $UA_{3,4}$ in question, which configuration is applied to the B series of inputs of this comparator. There is then "0" at the output of comparator 8 of this unit, and when a third active front is applied to terminal 11, a "0" appears at terminal 10 and prevents unit $UT_{3,4}$ from beginning another elementary operation if it again claims use of the bus. Furthermore, said second active front modifies the addressing of the memories of the other arbitration units, and in one of those which claim priority, namely the one which follows in the order of the complete cycle the unit just having had priority, there is equality between the configurations applied to the A and B inputs of comparator 8, and it is this latter unit which receives the priority at the third active front of the clock signal, and allows its processing unit to use the bus to carry out an elementary operation.

Of course, if during a lapse of time a single processing unit claims use of the bus, the priority is attributed thereto as long as it emits a "1" at terminal 12 and as long as no other processing unit claims use of the bus.

It will be noted that a complete priority attribution cycle, i.e. a cycle during which all the processing units claiming use of the bus receive priority once, comprises at most (in the case where the sixteen processing units all claim use of the bus) four main cycles during each of which each level receives the priority once. A second cycle of each level is then accomplished after four main cycles. Of course, if in one or more levels no request for use of the bus is emitted, the main cycles are consequently reduced, and if in a given level some units do not claim use of the bus, the corresponding secondary cycle is accordingly reduced.

From the explanations given above and knowing the above-mentioned article of "Computer Design", a man skilled in the art may easily program memories such as memories 6 and 7.

In the case of the preferred embodiment of FIG. 2, all the arbitration units $UA_{1,1}$ to $UA_{p,n}$ are identical to units $UA_{3,4}$ and all their memories are programmed exactly like memories 6 and 7 respectively. Only the connections external to the printed-circuit cards comprising the components of the individual circuits are constructed in a way specific to each processing unit. Consequently, the printed-circuit cards comprising the arbitration units and, if such be the case, the corresponding processing units, are all interchangeable, which facilitates maintenance of the multiprocessor system in accordance with the invention.

Dividing the processing units into several levels or even sublevels enables individual arbitration units to be used which are relatively simple and easy to construct, even when the number of processing units of the multiprocessor system is very high. The ROMs such as memories 6 and 7 are very easy to program because of their relatively small capacity: in the case, which may be considered as very complex, of a multiprocessor system having sixteen processing units, memories 6 and 7 are identical and are of the $64 \times 2$ bit type or of a very current type having a greater capacity, for example $256 \times 4$.

Within the scope of the invention, it is also possible to modify at any time the order of priorities for example by replacing one or more of the ROMs of the individual arbitration circuits by other differently programmed memories. These other memories may be switched by any appropriate device controlled manually or by the multiprocessor system itself. It is also possible to use RAMs instead of ROMs, the contents of these RAMs being modified by appropriate known means.

Furthermore, the levels may be subdivided into sublevels, the elementary arbitrator 3 becoming the sublevel arbitrator and an additional elementary arbitrator being disposed in each arbitration unit, the connection of this additional arbitrator being similar to that of arbitrator 3, the outputs of this additional arbitrator being connected to a third series of inputs of the comparator appropriately provided.

What is claimed is:

1. A decentralized arbitration device for several processing units of a multiprocessor system comprising p.n processing units all connected to a common bus and divided into p groups each comprising n processing units each associated with an arbitration unit, wherein each arbitration unit comprises an elementary arbitrator for individual priority determination and an elementary arbitrator for group priority determination, the inputs of the individual priority elementary arbitrators being connected, in each group, to the corresponding conductors of an individual request connection particular to the group considered, the inputs of the elementary arbitrators for group priority determination of all the arbitration units being connected to the corresponding conductors of a common group priority request connection, the inputs of the two elementary arbitrators of each arbitration unit being also connected to the output of a priority request signaling device of the corresponding processing unit whereby said arbitration device has a priority attribution cycle wherein each unit having a priority request is allowed to perform a single elementary operation in each cycle.

2. The decentralized arbitration device as claimed in any one of the claims 1 or 2, wherein said identification circuit comprises a coding circuit, preferably binary coding, supplying a group code corresponding to the group in which is disposed the processing unit with which the arbitration unit considered cooperates and supplying a rank code corresponding to the rank of this processing unit in its group, this identification circuit being connected to said priority request signaling device.

3. The decentralized arbitration device as claimed in claim 2, wherein said signaling device comprises a transcoding ROM one addressing input of which is connected to the bus utilization request output of the corresponding processing unit and the other addressing inputs of which are connected to said identification circuit, the outputs, preferably of the open-collector type, of this memory and whose number is equal to the sum of the number of groups and of the number of processing units per level, being connected to the corresponding inputs of the groups elementary arbitrator and of the individual elementary arbitrator, respectively.

4. The decentralized arbitration device as claimed in claim 1 further comprising, for each arbitration unit, a comparator having two series of inputs with the first series of inputs constituting the outputs of said two elementary arbiters and the second series of inputs constituting the output of a identification circuit which identification circuit identifies a processing unit being considered and its arbitration unit wherein the output of said comparator provides an indication of identity between said first series of inputs and second series of inputs with the output of said comparator being connected through a flip-flop register to a bus utilization authorization input of the corresponding processing unit whereby the two elementary arbiters supply the same identity as that supplied by said corresponding identification circuit when said elementary arbiters have determined that the corresponding unit may use said bus in response to a priority request of said unit.

* * * * *